June 30, 1936.    R. J. MINSHALL ET AL    2,045,667
TRIMMING AND BALANCING FLAP FOR AIRCRAFT
Filed May 8, 1933    2 Sheets-Sheet 1
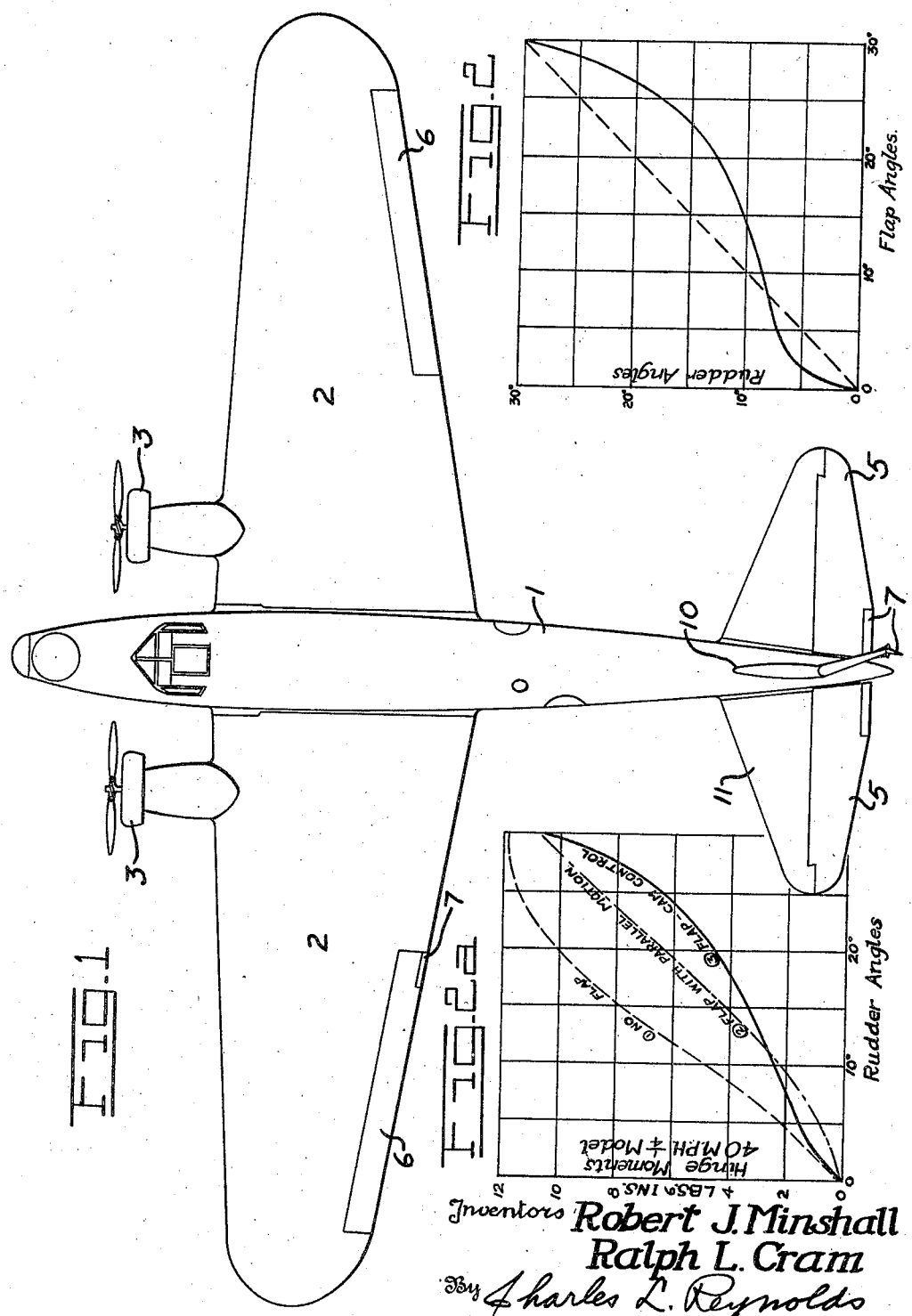
Inventors Robert J. Minshall
Ralph L. Cram
By Charles L. Reynolds
Attorney

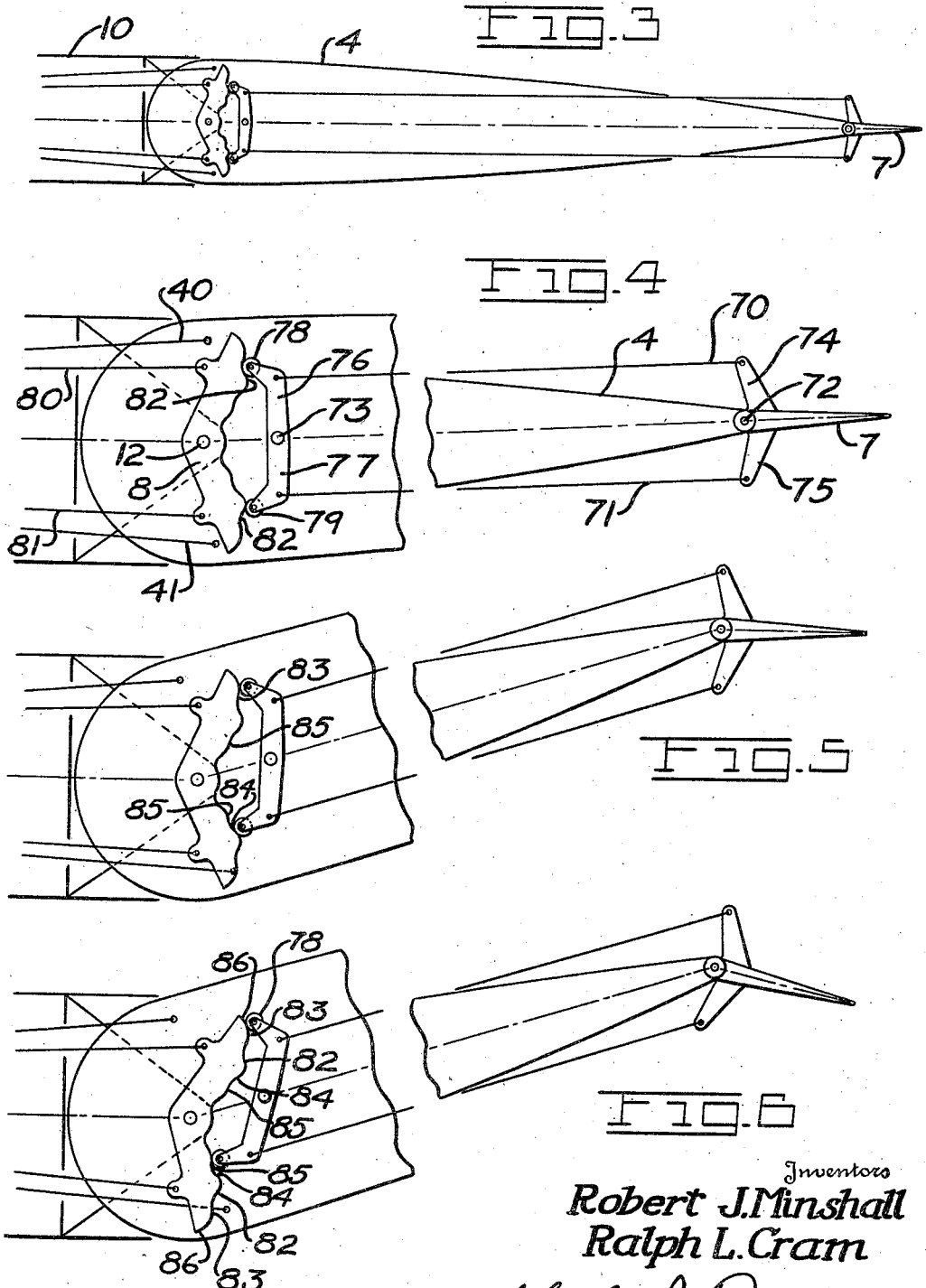

Patented June 30, 1936

2,045,667

UNITED STATES PATENT OFFICE 2,045,667

TRIMMING AND BALANCING FLAP FOR AIRCRAFT

Robert J. Minshall, Seattle, and Ralph L. Cram, Seahurst Park, Wash., assignors to Boeing Airplane Company, Seattle, Wash., a corporation of Washington Application May 8, 1933, Serial No. 669,900

31 Claims. (Cl. 244—29)

The present invention relates to airplane control surfaces such as the rudder, elevators and ailerons.

Considerable force is met with in swinging the control surfaces of a large airplane to any considerable angular extent from a neutral position. It is desirable to provide means to counteract this force to some degree and to assist the pilot in swinging the control surfaces, and it is also desirable that the pilot be provided with means whereby he can trim the airplane, in case of necessity, by displacing one of the control surfaces, for instance, the rudder, from its normal straightahead or neutral position to counteract an unbalance thrust. Such an unbalanced thrust may result from the cutting out of one of a pair of dual outboard motors. Such an arrangement is disclosed in the patent of Leslie R. Tower, No. 1,914,000. The control surface to be displaced may be the elevator, to accomplish what has usually been accomplished by adjustment of the stabilizer; the ailerons, or at least one aileron, may have such balancing and/or trimming means associated therewith.

The Tower arrangement proposed a parallelogram connection of the controls to the flap, whereby, for balancing, a given angular displacement of the rudder from the neutral position, whether large or small, produced an identical angular displacement of the flap in the opposite direction. Thus the flap maintained parallelism with the instantaneous line of flight, i. e., with the longitudinal axis of the airplane, and it was not possible to swing the rudder without swinging the flap relative thereto. This produced overbalancing at small angles of the rudder, and underbalancing at large rudder angles, as compared to the most favorable degree of balancing. One object of this invention is to lessen the hinge moments upon the rudder for the larger angles, over those present with no flap and with the parallelogram arrangement, respectively, to the end that the pilot may maintain control of the airplane with less physical effort and with less strain on the controls.

As noted, the parallelogram arrangement produced overbalancing at small rudder angles, and the pilot lost the "feel" of the controls. Such small movements of the rudder and other controls are chiefly employed to maintain the airplane in proper trim and upon a straight course, and as no large hinge moments are produced by these minor corrective movements of the controls, it is unnecessary to balance them, but rather it assists the pilot to leave him the proper "feel" in the controls. It is therefore another object to increase the hinge moments for small rudder angles, over those present with the parallelogram arrangement, though possibly lessening them over those present with no flap action.

More generally speaking, then, it is an object of this invention to provide an automatically balancing flap of the same general characteristics as proposed by Tower, but somewhat less responsive for small rudder angles, and somewhat more responsive for larger angles, and thus to provide a flap which is better suited, by reason of differential movement relative to its control surface, to fulfill the needs of the pilot at any rudder angle.

The Tower flap was available for trimming action, to effect swinging of the rudder upon swinging the flap relative thereto, and thereafter the flap was available for balancing action upon swinging of the rudder to one side or the other of the new neutral position, wherein it was shifted angularly, or to one side of the normal straight-ahead position, and it is a further object of this invention to provide means whereby the flap may be used for trimming, and whereby after shifting the neutral position of the rudder, the balancing means is still available, and acts in substantially the same manner as before, to give a differential movement to the flap as the rudder is swung from this new neutral position.

The present invention, then, has in view the objects above, which may be summed up as the provision of a flap and control surface combination and control means for the two so interconnected as to effect and/or permit relative movement of the control surface and flap differentially, as indicated above, and as will best suit the pilot's needs in all positions of the rudder, and whether or not the flap has been used for trimming.

It is also an object to provide such a combination in which the several elements are under independent control of the pilot at all times.

It is also an object to provide such a combination, and particularly controls, which shall be simple and light in weight, yet thoroughly reliable.

Our invention comprises the novel parts, and the novel combination and arrangement thereof, as shown in the accompanying drawings, described in this specification, and as will be more particularly pointed out by the claims terminating the same.

In the accompanying drawings we have shown our invention embodied in typical forms, and in association with a commercial transport airplane having dual motors, one on each side of the fuselage.

Figure 1 is a plan view of such an airplane, showing our invention incorporated therein.

Figure 2 is a graph of the relative angles of the rudder and the flap thereon. Figure 2a is a similar graph of typical hinge moments at the different rudder angles.

Figure 3 is a diagrammatic elevation of the rudder, flap and control means in the neutral or straight-ahead position.

Figure 4 is a similar view, showing the rudder displaced slightly for correcting a deviation from the straight course.

Figure 5 is a similar view, showing the rudder swung to an extent to alter the direction of the airplane.

Figure 6 is a view similar to Figure 5, but showing the flap control adjusted for trimming, as would be necessary in an emergency such as the cutting out of one of the two motors.

It has been noted heretofore, and it will be obvious, that the principles of this invention may be applied not only to the rudder of an airplane or other aircraft, but also to the elevators and ailerons, but for convenience of description it will be described only with relation to the rudder. From this description it will be evident how such principles may be applied to elevators and ailerons.

The airplane illustrated in Figure 1 comprises the fuselage 1, the wings 2, and a pair of motors, one on each wing outside the fuselage, shown as enclosed within the ring cowl 3. Such an airplane is controlled in flight by a rudder 4, elevators 5, and ailerons 6. These are hingedly mounted, as is customary, the rudder to the vertical fin 10, the elevators to the stabilizer 11, and the ailerons to the wings 2.

Supported upon the rudder 4 and upon the elevators 5, preferably to move relatively thereto, and hinged at the trailing edge thereof, is a flap 7. A like flap is similarly supported upon at least one aileron; usually it is necessary to employ a flap in connection with only one aileron, since lateral stability can be obtained by depressing or raising one aileron alone, and it is then unnecessary to provide means to coordinate the action of the two flaps on the different ailerons.

In Figures 3 to 6 inclusive, which illustrate the rudder, fin and flap as a typical embodiment of our invention, it will be seen that the rudder 4 is pivoted upon the fin at 12. Control means are provided for swinging the rudder from its neutral or straight-ahead position about this pivot 12, and while various means may be employed to accomplish this, such means are diagrammatically illustrated as the cables 40 and 41, for which, in practice, may be substituted any suitable or usual means. These cables extend to a suitable control for operation by the pilot, and by means of such controls 40 and 41, or any equivalent thereof, the rudder can be swung within its limits of swing to one side or the other of its neutral position.

The flap 7 is shown as pivotally mounted upon the rudder, preferably near the trailing edge, as we have indicated, upon the pivot 72. As in the case of the rudder controls, any suitable means may be provided for swinging the flap relatively to the rudder, and such means have been diagrammatically illustrated by the cables 70 and 71 connecting to the respective masts 74 and 75 projecting from opposite sides of the flap.

Instead of extending the cables 70 and 71 through to the pilot's station as in the Tower arrangement, for the purpose of controlling the flap, we prefer that these flap controls, typified by the cables 70 and 71, do not extend directly to the pilot's station, but that means be interposed between the flap and the pilot's station (preferably within the rudder itself) whereby the pilot can control the position of these cables and consequently of the flap relative to the rudder, and whereby the movement of the rudder may automatically control movement of the flap. To this end the cables 70 and 71 are connected to the opposite ends 76 and 77, respectively, of a lever arm pivoted at 73 upon the rudder. For convenience, the points of securement to the lever arms are substantially equal to the lengths of the masts 74 and 75, forming a parallel motion connection. Adjacent this lever 76, 77 is supported a cam member 8, which may also be pivoted at 12, concentrically with the pivot axis of the rudder; this cam member constitutes a lever.

The surface of the adjustable cam member 8 which is towards the lever 76, 77 is provided with two cams, one of which cooperates with a cam follower 70 upon the lever arm 76, and the other of which cooperates with a cam follower 79 upon the arm 77. The cam surface should be so designed that both cam followers 78 and 79 will be in contact with the cam surface at all times and for all relative positions of the flap and rudder relative to each other and to the fin 10.

Adjustment of the position of the cam member 8 is accomplished from the pilot's station by any suitable control means, and to an end which will be clear hereafter, and as typical of such means, I have illustrated the cables 80 and 81, connected to the member 8 at opposite sides of its pivot axis. These controls 80 and 81 are independent of the controls 40 and 41, by means of which the rudder is swung relative to the fin, yet through the interconnection of the cam member 8 and the lever 76, 77 the operation of either of the controls 40, 41 or 80, 81 may ultimately effect movement of both the rudder and flap.

Let us refer for the moment to Figures 2 and 2a. In Figure 2 the abscissae represent the flap angles, and the ordinates the rudder angles. It is assumed that the cam member 8 is held stationary in the position of Figures 3, 4 and 5, and the solid line indicates the relative angles of the rudder and flap. The dash line indicates equal angles of flap and rudder, such as would be attained by the parallelogram arrangement of Tower. The solid line shows that there is but slight angular displacement of the flap relative to the rudder, much less than the rudder displacement, for rudder angles up to 5°. Their angular relationship to one another is substantially unchanged. Beyond that point the flap swings differentially relative to the control surface, i. e. the angle of the flap increases more rapidly than the rudder angle increases—the cam follower 78 or 79 has moved over the cam to an extent to swing the flap through a considerable angular amount. At about 7½° rudder angle the flap angle has been increased to the extent that the flap also has swung through 7½°, bringing it parallel to the longitudinal axis of the airplane. As the rudder angle increases the flap angle continues to increase, but to a greater extent for a time. This progressively increases the balancing effect throughout this range—say from 5° to 15° rudder angle. Beyond 15° rudder angle, while the flap angle increases, the increase is not so rapid and is less in proportion to the increase in rudder angle. As Figure 2a shows, the hinge moment begins to drop off at this angle, when no flap is used. Finally at 30° rudder angle (usually the limit of its movement), the flap again reaches parallelism with the longitudinal axis of the airplane.

The effect of these movements of the flap on the hinge moments acting on the rudder, for a typical installation and at a given speed, is seen in Figure 2a. The hinge moments with no flap are shown in the dash line, and rise sharply throughout the major part of the swing of the rudder, tapering off only towards the limits of its swing. With the parallelogram control of the flap, shown in the dot-and-dash line, the hinge moments are too small at small rudder angles, whence results the tendency to overbalancing, but thereafter increase substantially in direct ratio to the rudder angle, to such an extent that there is inadequate balancing beyond about 10° or 11° rudder angle. The solid line, representing the action with the present cam control, shows an increase of hinge moments at small angles which compares closely with the curve with no flap, thus preserving the "feel" of the controls. There is, in effect, substantially no change from the hinge moments with no flap. Beyond these small angles the curve falls away rapidly, until it crosses the curve representing the parallelogram action, indicating smaller hinge moments, and a slower rate of increase thereof. At no point does the curve again cross the parallelogram curve, nor approach closely to the "no flap" curve, the hinge moments being always less for the larger angles, thereby to a greater extent assisting the pilot in swinging the rudder for the larger angles thereof.

Obviously, once it is determined that these results are necessary or desirable, and their importance is appreciated, a cam or other motion-transmitting means can be designed to accomplish these results, and such a cam is illustrated in Figures 3 to 6 inclusive. As seen in Figure 4 the portions 82 of the cam are nearly if not quite concentric to its pivot axis at 12, and as the cam followers move over this curved portion 82 there is no tendency, or but little tendency, if the surface departs only slightly from concentric, to change the angle of the flap relatively to the rudder. This corresponds to the limited movements of the rudder required for maintaining the airplane on its course, and in Figure 4 the rudder is shown displaced slightly from its neutral position (the latter being shown in Figure 3), and the flap is substantially directly in line with the rudder.

However, further movement of the rudder with the cam lever 8 held in its normal position will cause the cam followers to ride over the end of the concentric sections 82, and the one to reach the cam surface 83, and the other to ride on the cam surface 84. The cam surfaces 83 and 84 are so designed that they will cause automatic angular movement of the flap relative to the rudder according to any diagram such as is illustrated in Figure 2, though as will be evident, the graph representing the angular changes may be varied and the cams may be suitably designed to accomplish any such altered movement that may be desired.

In all the foregoing it has been assumed that the cam 8 is fixed in position, and that movement of the rudder under the influence of its controls 40 and 41 was the means which automatically accomplished movement of the flap relatively to the rudder. In this case the flap operates only as a balance flap. However, the flap 7 may also operate as a control flap to trim or control the plane, and for this purpose movement of the flap relatively to the rudder can be accomplished manually by adjusting the cam 8, and in fact, movement of the rudder can be initiated and controlled by movement of the cam 8 to the exclusion of or in conjunction with the normal controls 40 and 41.

The arrangement of parts to this end is shown in Figure 6. This would normally be employed when one of the motors 3 had cut out, and it was necessary to hold the rudder 4 to one side to counteract the unbalanced thrust of the motor still in operation. Thus in Figure 1, if we assume that the left hand motor 3 has cut out, and that the right hand motor 3 is still operating, the rudder 4 has been thrown to the right to counteract the tendency of the motor on this side to move this side ahead of the left side, and the flap 7 has now been adjusted relatively to the rudder to assist in maintaining it in this position, yet at the same time the neutral position of the flap, that is, the median position at which the flap is not adjusted angularly relatively to the rudder, has likewise been displaced angularly about the pivot axis of the rudder. This will alter the action of the flap, but not sufficiently to hinder maneuvering of the airplane in continued flight while seeking a landing.

Referring now to Figure 6, it will be seen that the left hand side of the cam lever 8 has been drawn forward from the neutral position shown in Figure 3. The immediate effect of this is to bring the cam follower 79 over and past the surface 84 and onto the surface 85, and the follower 78 has now passed beyond the surface 83 to the surface 86. These surfaces are so designed that they will effect immediate angular displacement of the flap relatively to the rudder, and this in turn causes swinging of the rudder and further moves the cam followers 78 and 79 relatively to their cams. Thus in effect the controlled adjustment of the flap effects movement of the rudder, and established a new zero-moment position thereof in a deflected attitude yet the rudder is still under the control of the pilot, and may be moved for control either side of its newly established neutral position. Steering movement of the rudder in this manner effects corresponding balancing movement of the flap and assists in swinging the rudder from its new neutral position as it did when swung either side of the former straight-ahead neutral position.

What we claim as our invention is:

1. In combination with an airplane structure, a control surface pivotally mounted thereon, a balancing flap pivotally mounted upon the control surface, control means operable by the pilot for swinging the control surface from a given position, and automatic means for swinging the flap relatively to the control surface, including a cam follower operating to maintain the angular relationship between the flap and the control surface substantially unchanged for angular departures of the latter by a predetermined amount from such given position.

2. In combination with an airplane structure, a control surface pivotally mounted thereon, control means operable by the pilot to swing said control surface, a trimming and balancing flap pivotally mounted upon said control surface, means associated with the control surface to effect swinging of the flap relatively to the control surface upon swinging of the latter by its control means relatively to the airplane structure, and control means independent of the first control means, and including cam means, operable by the pilot to swing the flap relatively to the control surface, thereby to effect or assist swinging of the control surface.

3. In combination with an airplane structure, a control surface pivotally mounted thereon, control means normally operable to swing said control surface, a flap pivotally mounted upon said control surface, means associated with the control surface to effect swinging of the flap relatively to the control surface, and including lost motion means to permit limited swinging movement of the control surface either side of a neutral point without appreciable swinging of the flap relative to the control surface.

4. In combination with an airplane structure, a control surface pivotally mounted thereon, control means normally operable to swing said control surface, a flap pivotally mounted upon said control surface, means associated with the control surface to effect swinging of the flap relatively to the control surface, and including lost motion means to permit limited swinging movement of the control surface either side of a neutral point without appreciable swinging of the flap relatively to the control surface, and control means independent of the first control means for swinging the flap relatively to the control surface, thereby to effect or assist swinging of the control surface.

5. In combination with an airplane structure, a control surface pivotally mounted thereon, control means normally operable to swing said control surface, a flap pivotally mounted upon said control surface, means associated with the control surface to effect swinging of the flap relatively to the control surface, and including lost motion means to permit limited swinging movement of the control surface either side of a neutral point without appreciable swinging of the flap relatively to the control surface, and means to adjust the position of said lost motion means to vary the position of such neutral point angularly relative to the pivot axis of the control surface.

6. In combination with an airplane structure, a control surface hingedly mounted thereon, a balancing flap hingedly mounted on the control surface, a cam normally fixed with relation to the airplane structure, a cam follower engaged therewith and mounted upon the control surface, distant from the flap, to move with the control surface over the cam, and to be moved thereby relatively to the control surface, and an operative connection between the cam follower and the flap, to swing the latter automatically in a manner controlled by the cam as the control surface moves relatively to the airplane structure.

7. In combination with an airplane structure, a control surface hingedly mounted thereon, a flap hingedly mounted on the control surface, a cam normally fixed with relation to the airplane structure, a cam follower engaged therewith and mounted upon the control surface to move with the latter over the cam, to be moved thereby relatively to the control surface, an operative connection between the cam follower and the flap, to swing the latter automatically in a manner controlled by the cam as the control surface moves relatively to the airplane structure, and means to adjust the position of the cam, at will, relative to the airplane structure, thereby to alter the relative actions of the cam and the cam follower.

8. In combination with an airplane structure, a control surface hingedly mounted thereon, a flap hingedly mounted on the control surface, control means for swinging the control surface, and independent control means for swinging the flap comprising a cam pivoted concentrically with the control surface, a lever arm pivoted on the control surface between the latter's pivot and the flap, and engaging said cam, means operatively connecting the flap and lever arm to swing the flap responsively to movements of the lever arm as it moves over the cam, and pilot-controlled means for adjusting the cam angularly about its pivot.

9. In combination with an airplane structure, a movable main control surface, pilot-operated control means normally operable to move said control surface, a movable auxiliary control surface operatively connected to the main control surface, means associated with the main control surface whereby, upon movement of the latter, to effect movement of the auxiliary control surface, thereby to assist such movement of the main control surface, and including lost motion means to permit limited movement of the main control surface from a neutral position without appreciable movement of the auxiliary control surface from a neutral position.

10. The combination of claim 9, and control means independent of the first control means to move the auxiliary control surface, independently of movement of the main control surface, thereby to effect or assist movement of the latter.

11. The combination of claim 9, wherein the main control surface is pivotally mounted to swing to each side of its neutral position, and means to adjust the position of the lost motion means to vary the disposition of such neutral position angularly relative to the pivot axis of the main control surface.

12. The combination of claim 9, and means to adjust the position of the lost motion means to vary the disposition of the neutral position of the main control surface relative to the longitudinal axis of the aircraft structure.

13. In combination with an airplane structure, a control surface pivotally mounted thereon, a flap pivotally mounted upon the control surface, control means for swinging the control surface from a given position, and means automatically operating upon movement of the control surface beyond a predetermined angular departure from such given position to initiate swinging of the flap relatively to the control surface.

14. The combination of claim 13, and means to adjust the latter means to vary the location of the point where swinging of the flap is initiated.

15. The combination of claim 13, and means independent of the control means mentioned, to swing the flap relatively to the control surface.

16. In combination with an airplane structure, a control surface pivotally mounted thereon, a balancing flap pivotally mounted upon the control surface, control means for swinging the control surface from a given position, and automatic means operating upon movement of the control surface beyond a predetermined angular departure from such given position to swing the flap relatively to the control surface at an initially greater angular rate, whereby to swing the flap through a greater total angle of departure from its original relationship to the control surface than the total angle of departure of the control surface from such given position, prior to reaching the limit of departure of the control surface.

17. In combination with an airplane structure, a control surface pivotally mounted thereon, a flap mounted upon and movable relatively to the control surface from a neutral position to stand at an angle to such control surface, control means normally operable to swing said control surface, mechanism, including a member mounted upon the control surface and means interengaged between the flap and such means upon control surface, automatically operating by departure of the control surface from a given position to move the flap from its neutral position, and pilot-controlled means independent of said control surface control means to move said flap at will from its neutral position.

18. In combination with an airplane structure, a control surface pivotally mounted thereon, a flap mounted upon and movable relatively to the control surface from a neutral position to stand at an angle to such control surface, control means normally operable to swing said control surface, automatic mechanism, including a member mounted upon the control surface and means interengaged between the flap and such member upon the control surface operating to move the flap from its neutral position, and pilot-controlled means operable through the member interengaged means of said automatic mechanism to move said flap at will from its neutral position.

19. In combination with an airplane structure, a control surface pivotally mounted thereon, a flap mounted upon and movable relatively to the control surface from a neutral position to stand at an angle to such control surface, means mounted to move with the control surface as it swings, normally fixed cooperating means engageable therewith to move the first means relatively to the control surface during swinging of the latter, an operative connection from said first means to the flap, to translate such relative movement of the first means into movement of the flap relative to the control surface, and control means operable by the pilot to adjust the position of the normally fixed means, thereby to alter the time and space relationship between the swinging of the control surface and the relative movement of the flap.

20. In combination with an airplane structure, a control surface hingedly mounted thereon, a balancing flap hingedly mounted upon the control surface, a member normally fixed relatively to the airplane structure, and a member mounted upon and movable with the control surface and engaging said fixed member to swing the flap relatively to said control surface only after predetermined swinging movement of the control surface relative to the airplane structure.

21. In combination, in an airplane or the like, a swingable control surface, a flap mounted thereupon and movable relatively thereto from a neutral position successively into a plurality of operative positions wherein, within limits, it assists in swinging the control surface increasingly, at a rate in excess of the increase in angular departure of the latter from a neutral position, control means to swing said control surface, and automatic means operating by swinging of the control surface to move said flap, said latter means including lost motion means to permit limited swinging movement of the control surface either side of its neutral position without appreciable movement of the flap from its neutral position.

22. In combination with an airplane structure, a control surface pivotally mounted thereon, a balancing flap pivotally mounted on the control surface, and automatic means inoperative to change substantially the angular relationship of the flap relative to the control surface, during movement of the latter through small angles from a neutral position, but operating, upon swinging of the control surface beyond such small angular movement, from such neutral position, to move said flap relatively to the control surface, thus to produce a balancing force balancing the resistance to movement of the control surface through large angles.

23. In combination with an airplane structure, a control surface pivotally mounted thereon, control means for swinging the control surface from a neutral position, a balancing flap pivotally mounted upon the control surface, and automatic means operating to swing the flap relatively to the control surface only upon departures of the control surface beyond predetermined small angular movements from such neutral position, to effect a balancing action.

24. In combination with an airplane structure, a control surface pivotally mounted thereon, control means operable by the pilot to swing said control surface, a trimming flap pivotally mounted on said control surface, and control means independent of said first control means, and including cam means, operable by the pilot to swing the flap relatively to the control surface, thereby to effect or assist swinging of the control surface.

25. In combination with an airplane structure, a control surface pivotally mounted thereon, a balancing flap mounted upon said control surface, and automatic means, responsive to departure of the control surface from a neutral position, operating to swing said flap relatively to said control surface, through an angle less than the angle of control surface swing within predetermined limits, and through an angle greater than the angle of control surface swing beyond such limits.

26. In combination with an airplane structure, a control surface pivotally mounted thereon, a flap hingedly mounted and movable relative to the airplane structure, and means automatically operable by the control surface upon its movement away from a neutral position to swing said flap, within limits, through an angle of departure from its neutral position, greater than the angle of swing of the control surface from its neutral position, within such limits, and means for causing said flap to move at a different relative rate upon movement of the control surface beyond said limits.

27. In combination with an airplane structure, a control surface pivotally mounted thereon, a flap hingedly mounted and movable relative to the airplane structure, and means automatically operable by the control surface upon its movement away from a neutral position to swing said flap, within limits, through an angle of departure from its neutral position, greater than the angle of swing of the control surface from its neutral position, within such limits, and further means to effect swinging of the flap for movements of the control surface beyond such inside limits, at a different rate.

28. In combination with an airplane structure, a control surface pivotally mounted thereon, a flap hingedly mounted and movable relative to the airplane structure, and means automatically operable by the control surface upon its movement away from a neutral position to swing said flap, within limits, through an angle of departure from its neutral position, greater than the angle of swing of the control surface from its neutral position, within such limits, and further means to effect swinging of the flap, for movements of the control surface beyond such inside limits, at a lesser angular rate than the control surface.

29. In combination with an airplane structure, a control surface hinged thereupon, a hingedly mounted flap, control means for swinging the control surface from a given position, and means coming into operation automatically operable by the control surface upon movement of the latter beyond a predetermined angular departure from such given position to initiate swinging of the flap from a neutral position.

30. In combination with an airplane structure, a control surface pivoted thereon to swing from a neutral position, a flap associated with the control surface and supported to swing from a neutral position, and control mechanism, automatically operable by said control surface upon swinging of the control surface from its neutral position, including means to control operation of the flap at a rate in excess of the rate of increase in the angle of departure of the control surface from its neutral position, within predetermined limits, to increasingly balance the hinge moments upon the control surface.

31. In combination with an airplane structure, a control surface pivotally mounted thereon, a flap hingedly mounted and movable relative to the airplane structure, automatic means for governing the rate of turning of the flap relative to the control surface during motion of the control surface within limits, and further means for changing the rate of turning of the flap relative to the control surface upon movement of the control surface outside said limits.

ROBERT J. MINSHALL.
RALPH L. CRAM.